Feb. 23, 1954 F. O. FALKNER 2,669,820
DIGGING AND WINDROWING ROOT HARVESTER
Filed June 22, 1950 2 Sheets-Sheet 1
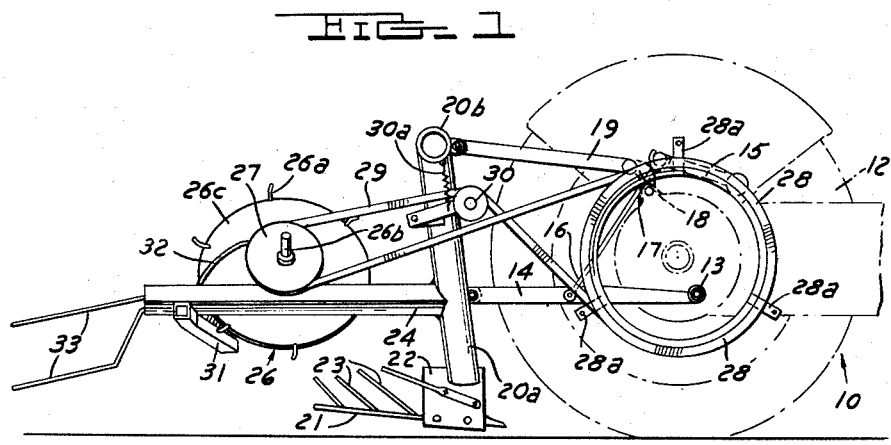
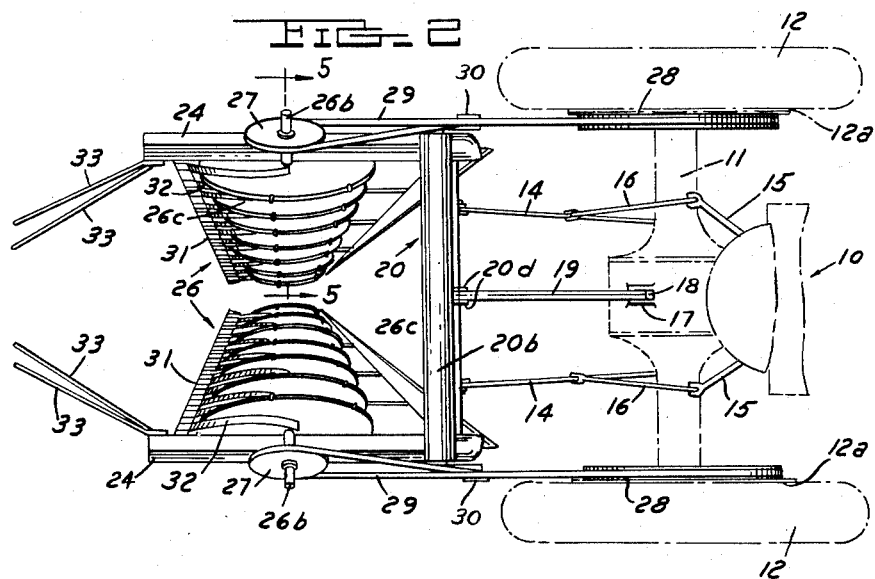
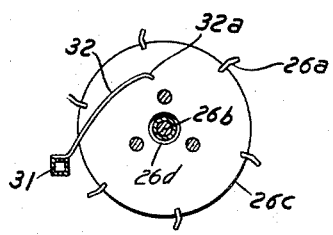
INVENTOR.
FRANCIS O. FALKNER
BY
*M. O. Schank*
ATTORNEY

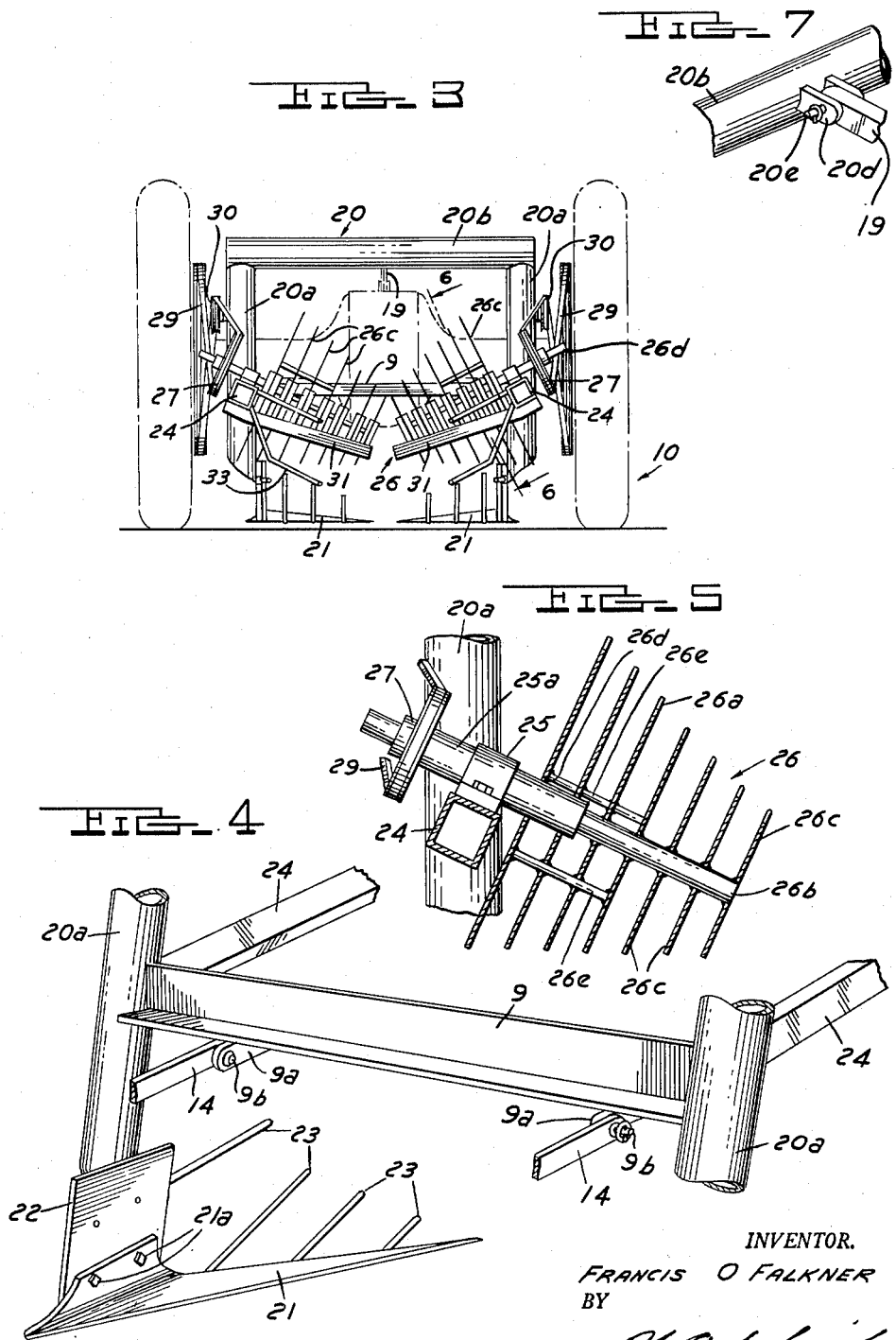

Patented Feb. 23, 1954

2,669,820

UNITED STATES PATENT OFFICE 2,669,820

DIGGING AND WINDROWING ROOT HARVESTER

Francis O. Falkner, Headland, Ala.

Application June 22, 1950, Serial No. 169,588

8 Claims. (Cl. 55—139)

1

This invention relates to an improved implement for harvesting root crops and particularly to a combination digging, vine lifting, shaking and windrowing implement for harvesting peanuts.

The harvesting of peanuts has long involved an inordinate amount of manual labor due to the complete lack of satisfactory machines for performing the various steps required for proper harvesting of peanuts. It is not only necessary that the peanut roots be loosened and lifted from the soil, but the vines with the roots attached must be vigorously shaken to free the adhering dirt particles and then be permitted to dry before the step of separating the peanuts from the vines can be accomplished. Such drying operation is most conveniently accomplished by depositing the loosened vines in a windrow with the root portions disposed on the outer edges of the windrow. The peanuts, when dry, can then be readily harvested from the vines by traversing a peanut combine along the windrow with a suitable windrow pick-up device.

Accordingly, it is an object of this invention to provide an improved peanut harvesting implement for effecting the digging, vine lifting, shaking, and windrowing of peanuts in a single traverse of the implement along one or more rows of peanuts.

A particular object of this invention is to provide a peanut harvesting construction which can be bodily mounted upon the power-lifted hitch links of a well known type of tractor and hence be lifted off the ground and carried by the tractor for the utmost convenience in transport, turning at the ends of the rows, etc.

A further object of this invention is to provide an improved form of rotatable vine lifting and shaking device for a peanut harvester, characterized by the employment of a conically shaped element rotatably mounted above the row of peanuts to be picked on a transverse and vertically inclined axis, which construction not only lifts and shakes the vines but also facilitates the formation of a windrow.

A particular object of this invention is to provide a tractor mounted peanut harvesting implement capable of operating simultaneously on two adjacent rows of peanuts and performing, in a single traverse over such rows, the operations of digging, vine lifting and shaking, and depositing in a common windrow both rows of peanuts operated on.

The specific nature of this invention, as well as other objects and advantages thereof, will become apparent to those skilled in the art from

2 the following detailed description, taken in conjunction with the attached sheets of drawings on which, by way of preferred example only, is illustrated one embodiment of this invention.

On the drawings:

Fig. 1 is a side elevational view of a peanut harvester embodying this invention shown in assembled relationship upon a well known type of tractor.

Fig. 2 is a plan view of Fig. 1.

Fig. 3 is a rear elevational view of Fig. 1.

Fig. 4 is an enlarged scale, partial perspective view showing the mounting of the digging blade on the main frame structure.

Fig. 5 is an enlarged scale, sectional view taken on the plane 5—5 of Fig. 2.

Fig. 6 is a sectional view taken on the plane 6—6 of Fig. 3.

Fig. 7 is a partial perspective view illustrating the mounting bracket for connecting the implement to the top link of a well known type of tractor.

As shown on the drawings:

The numeral 10 indicates the rear end portions of a well known type of tractor having a rear axle and differential housing 11 supported by rear wheels 12. At laterally spaced points 13 adjacent the lower extremities of the rear axle housing 11, a pair of hitch links 14 are respectively pivotally mounted for movement in a vertical plane. Hitch links 14 can be concurrently lifted by a hydraulic mechanism (not shown) mounted within the tractor which operates to rotate rocker arms 15 which, in turn, are respectively connected to the hitch links 14 by lift links 16. Near the top of the center of the rear axle housing 11, a pair of mounting lugs 17 are provided, in which is pivotally mounted one extremity of an angle shaped rocker 18 and the other end of rocker 18 pivotally mounts a top link 19. Each of the wheels 12 is provided on its inner face with a conventional brake housing 12a which is rotatable with the corresponding wheel. All of the foregoing structure is found on a well known make of farm tractor and further detailed description thereof is deemed unnecessary.

The peanut harvesting implement embodying this invention comprises a transversely disposed, inverted U-shaped main frame 20 which has opposed parallel leg portions 20a and a central bight portion 20b. Main frame 20 may be conveniently formed of welded tubing. An angle iron beam 9 (Figs. 3 and 4) is transversely mounted across the medial portions of the legs 20a of the main frame 20 and secured to such legs in any convenient manner, such as by welding. A pair of brackets 9a are respectively rigidly secured to transversely spaced points on the angle iron beam 9 and respectively mount laterally projecting pivot pins 9b which are insertable in the pivot bearings conventionally provided in the ends of the tractor hitch links 14. A pair of spaced ears 20d (Figs. 2 and 7) are welded to the center of the bight portion 20b of main frame 20 and the ears 20d receive the free end of the top link 19 therebetween and are pivotally secured to such top link by a transverse pin 20e. Accordingly, it is apparent that when the tractor hydraulic system is actuated to effect the lifting of hitch links 14, the main frame 20 will be lifted as a unit therewith.

The leg portions 20a of main frame 20 are laterally spaced a sufficient distance to straddle two adjacent rows of peanuts. In the preferred form of this invention, a digging blade 21 is rigidly attached to the lower extremities of each main frame leg portion 20a in any convenient manner. For example, a mounting plate 22 may be welded to the bottom of leg portion 20a and the digging blade 21 attached to mounting plate 22 by suitable bolts 21a. Digging blade 21 is of conventional construction and so arranged that, when drawn through the soil at a depth below the peanut roots, the blade 21 serves to loosen the peanut roots in the soil and to gently elevate the roots to the surface of the soil. Along the rear extremities of digging blade 21 and mounting plate 22, a plurality of tines 23 are rigidly mounted in transversely spaced relationship, and such tines project rearwardly and upwardly to facilitate the feeding of the peanut vines and roots to a vine lifting and shaking device 26 which will now be described.

Adjacent the medial portions of each vertical leg 20a of the main frame, a generally horizontal, rearwardly extending beam 24 is welded. When the implement is operated on two adjacent rows of peanuts, the longitudinal beams 24 are disposed parallel to and outside of the two rows of peanuts operated on. A sleeve type bearing unit 25 is rigidly attached in any convenient manner to the medial portions of longitudinal beams 24 and each bearing unit 25 mounts a bearing sleeve 25a which defines a transverse, downwardly inclined axis of rotation that overlies one of the rows of peanuts being operated on.

A vine lifting and shaking device 26 constructed in accordance with this invention is rotatably journaled by each bearing unit 25. Each vine lifting and turning device 26 is of generally conical configuration with the smaller end of the cone disposed inwardly relative to the main frame leg 20a. The conical angle of the vine lifting and shaking device 26 is so proportioned relative to the angle of inclination of the bearing axis provided by bearing unit 25 that the lower periphery of each lifting and shaking device 26 is disposed in substantially parallel relationship to the ground. Additionally, each vine lifting and shaking device 26 has a plurality of radially projecting fingers 26a mounted in spaced relationship on its periphery. The fingers 26a function to engage the peanut vines, which are directed by the tines 23 in proximity to the rotary path of such fingers 26a, and to carry the vines over the top of the vine lifting and shaking device 26. Such lifting operation serves to dislodge and remove any dirt clinging to the vines or to their attached root portions and, as will be later described in more detail, facilitates the depositing of the lifted vines in a properly formed windrow.

The lifting and dirt shaking functions of the rotatable elements 26 are best accomplished when each of such rotatable elements is constructed in the manner shown on the drawings. Such construction incorporates a central shaft portion 26b which is journaled in the elongated sleeve portion 25a of the bearing unit 25. A plurality of discs 26c are rigidly mounted by welding in axially spaced relationship along central shaft 26b and such discs are of progressively increasing diameter to provide the overall conical configuration of the vine lifting and shaking element 26. The outermost discs 26c have a large central aperture 26d therein to clear the inner end of bearing sleeve 25a. These outermost discs are supported in the assembly by being welded to a plurality of circumferentially spaced, axially extending rods 26e which are in turn welded to at least two of the central discs which are secured directly to the shaft 26b. The end of the shaft 26b which projects out of bearing sleeve 25a has a driving pulley 27 keyed thereto. Through the pulleys 27, each of the vine lifting and shaking elements 26 is driven at a speed proportioned to the ground travel of the implement. Such driving mechanism may, for example, comprise a belt 29 which is trained over the pulley 27 and also over a pulley 28 which is rigidly secured by brackets 28a to the rotating brake housing 12a of the tractor. Obviously, a chain and sprocket drive could also be employed. The medial portions of belt 29 are trained over a suitable belt tightening idler 30 which is pivotally mounted on the adjacent leg 20a of the main frame 20 and resiliently urged to a belt tightening position by a spring 30a. It should be noted that the direction of the rotation of the vine lifting and turning elements 26 is opposite to the direction of rotation of the tractor wheels.

After the vines have been lifted over the periphery of the rotating lifting and shaking elements 26, it is, of course, necessary to strip the vines from the pick-up fingers 26a to deposit the vines in the windrow and to prevent the vines from wrapping around the rotating elements 26 which would quickly render them useless. The vine stripping function is conveniently accomplished because of the utilization of the spaced discs 26c to form the lifting elements 26. A stripper support bar 31 is welded to the rear end of each beam 24 and extends transversely downwardly and forwardly in general parallelism with the periphery of the adjacent vine lifting and shaking elements 26. A plurality of resilient, band-like stripping elements 32 are mounted along each bar 31, there being a pair of bands for each disc 26c and each pair of bands being disposed in close lateral proximity to the sides of the respective discs 26c. As best shown in Fig. 6, the stripping bands 32 curve inwardly with respect to the periphery of their adjacent discs 26c and the extreme inner end 32a of each band is curved downwardly. Such configuration of the stripping bands 32 insures that all of the vines carried on the periphery of the discs 26c by the pick-up fingers 26a will be gently stripped off and removed from the disc periphery and the fingers as it passes between each pair of bands 32.

It should be particularly noted that with the described conical configuration of the vine lifting and shaking elements 26, and particularly with the mounting of such elements on inclined axes overlying the rows of peanuts to be operated on with their larger diameter portions on the outer extremities of the two adjacent rows, the vine lifting and shaking devices inherently tend to deposit the peanut vines in a central windrow. Due to the inclined axis arrangement, those vines lying on the extreme laterally outward sides of the two rows being operated on are picked up by the large diameter portions of the lifting and shaking elements 26 and are brought inwardly as they are lifted by the elements 26, for the reason that is most apparent from observing Fig. 3, wherein it will be noted that the top portions of the outermost discs 26c are disposed laterally inwardly a substantial distance from the lower portions of the corresponding discs. Furthermore, the larger diameter of the outermost discs 26c assures that the vines picked up by such discs will be discharged with greater velocity than the vines carried by the innermost discs and this also emphasizes the tendency to throw the vines into the center.

If desired, to further facilitate the formation of a windrow of the lifted and shaken vines a plurality of rearwardly and inwardly projecting crowding rods 33 may be secured to the extreme rear ends of the beams 24.

From the foregoing description, the operation of the improved implement is believed to be clearly apparent. When the tractor is driven over two adjacent rows of peanuts, with the center line of the tractor and implement substantially aligned with such center line, the digging blades 21 respectively operate on the two rows to loosen the vines and their roots from the soil and, with the cooperation of the tines 23, will serve to elevate the vines into proximity with the rotary path of the vine pick-up fingers 26a on the vine lifting and pick-up elements 26. The vines are then lifted and turned by the lifting and shaking elements 26, and, in this process, any dirt adhering to the vines is dislodged and falls readily to the ground without clogging the elements 26 due to the substantial spacing provided between the discs 26c which form such element. The vines are not only deposited by the lifting and shaking elements 26 in a windrow, but they are deposited with the root portions of the vine, and hence the peanuts, disposed on the outer extremities of the formed windrow, which greatly facilitates the drying of the peanuts and permits the subsequent combining operation to be more quickly accomplished.

The described implement is of unusually simple, economical, yet rugged construction and is particularly fool-proof in its operation, inasmuch as no adjustments are required by the operator, other than the operation of the tractor hydraulic system to assure that the digging blades are maintained at the proper depth in the soil to perform the digging operation.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A peanut harvester for use with a tractor having a pair of laterally spaced, power lifted trailing hitch links and a central top link, comprising a transversely disposed, inverted U-shaped main frame constructed and arranged to straddle a row of peanuts, said main frame having a horizontal bight portion and depending vertical leg portions, a transverse beam connecting the vertical leg portions of said main frame, bracket means on said beam adapted for pivotal connection respectively to the tractor hitch links, means on the bight portion of said main frame adapted for pivotal connection to the tractor top link, whereby said main frame is liftable by the tractor hitch links, a digging blade secured to the bottom end of one of said vertical leg portions and constructed and arranged to loosen the vines in the soil as the harvester proceeds along the row, a rearwardly extending beam secured to the medial portion of said one vertical leg portion, a rotatable vine lifting device, bearing means on said rearwardly extending beam for journaling said vine lifting element for rotation about a transverse and downwardly inclined axis overlying the row of peanuts, and means for driving said vine lifting element at a speed proportional to the ground speed of the tractor.

2. A peanut harvester for use with a tractor having a pair of laterally spaced, power lifted trailing hitch links and a central top link, comprising a transversely disposed, inverted U-shaped main frame constructed and arranged to straddle two adjacent rows of peanuts, said main frame having a horizontal bight portion and depending vertical leg portions, a transverse beam connecting the vertical leg portions of said main frame, bracket means on said beam adapted for pivotal connection respectively to the tractor hitch links, means on the bight portion of said main frame adapted for pivotal connection to the tractor top link, whereby said main frame is liftable by the tractor hitch links, a pair of digging blades respectively secured to the bottom ends of said vertical leg portions and constructed and arranged to loosen the vines in the soil as the harvester proceeds along the adjacent rows, a pair of rearwardly extending beams respectively secured to the medial portions of said vertical leg portions, a pair of rotatable vine lifting devices, bearing means on said rearwardly extending beams for respectively journaling said vine lifting elements for rotation about transverse and downwardly inclined axes respectively overlying the two rows of peanuts operated on, and means for driving said vine lifting elements at a speed proportional to the ground speed of the tractor.

3. A peanut harvester for use with a tractor having a pair of laterally spaced, power-lifted trailing hitch links and a central top link, comprising a transversely disposed, inverted U-shaped main frame constructed and arranged to straddle a row of peanuts, said main frame having a horizontal bight portion and depending vertical leg portions, a transverse beam connecting the vertical leg portions of said main frame, bracket means on said beam adapted for pivotal connection respectively to the tractor hitch links, means on the bight portion of said main frame adapted for pivotal connection to the tractor top link, whereby said main frame is liftable by the tractor hitch links, a digging blade secured to the bottom of said main frame and constructed and arranged to loosen the vines in the soil as the harvester proceeds along the row, a horizontal rearwardly extending beam secured to said main frame, a rotatable vine lifting device, bearing means on said rearwardly extending beam for journaling said vine lifting element for rotation about a transverse and downwardly inclined axis overlying the row of peanuts, a first pulley on the outer end of said vine lifting element, a second pulley attachable to the adjacent tractor wheel and a belt interconnecting said pulleys, thereby driving said vine lifting element at a speed proportional to the ground speed of the tractor.

4. A peanut harvester for use with a tractor having a pair of laterally spaced, power lifted trailing hitch links and a central top link, comprising a transversely disposed inverted U-shaped main frame constructed and arranged to straddle a row of peanuts, said main frame having a horizontal bight portion and depending vertical leg portions, a transverse beam connecting the vertical leg portions of said main frame, bracket means on said beam adapted for pivotal connection respectively to the tractor hitch links, means on the bight portion of said main frame adapted for pivotal connection to the tractor top link, whereby said main frame is liftable by the tractor hitch links, a digging blade secured to the bottom of one of said vertical leg portions and constructed and arranged to loosen the vines in the soil as the harvester proceeds along the row, a rearwardly extending beam secured to the medial portion of said one vertical leg portion, a rotatable vine lifting device, bearing means on said rearwardly extending beam for journaling said vine lifting element for rotation about a transverse and downwardly inclined axis overlying the row of peanuts, said vine lifting element comprising a generally conically shaped device disposed with its small end inward and with its lowermost periphery substantially parallel to the ground, a plurality of radially projecting fingers secured to the periphery of said vine lifting element and forming a conical array, and means for driving said vine lifting element at a speed proportional to the ground speed of the tractor.

5. A peanut harvester for use with a tractor having a pair of laterally spaced, power lifted trailing hitch links and a central top link, comprising a transversely disposed inverted U-shaped main frame constructed and arranged to straddle two adjacent rows of peanuts, said main frame having a horizontal bight portion and depending vertical leg portions, a transverse beam connecting the vertical leg portions of said main frame, bracket means on said beam adapted for pivotal connection respectively to the tractor hitch links, means on the bight portion of said main frame adapted for pivotal connection to the tractor top link, whereby said main frame is liftable by the tractor hitch links, a pair of digging blades respectively secured to the bottom ends of said vertical leg portions and constructed and arranged to loosen the vines in the soil as the harvester proceeds along the two adjacent rows, a pair of rearwardly extending beams respectively secured to the medial portions of said vertical leg portions, a pair of rotatable vine lifting devices, bearing means on said rearwardly extending beams for respectively journaling said vine lifting elements for rotation about transverse and downwardly inclined axes respectively overlying the two rows of peanuts operated on, each of said vine lifting elements comprising a generally conically shaped device disposed with its small end inward and with its lowermost periphery substantially parallel to the ground, a plurality of radially projecting fingers secured to the periphery of said vine lifting element and forming a conical array, and means for driving said vine lifting element at a speed proportional to the ground speed of the tractor.

6. The combination defined in claim 5 wherein each of said vine lifting elements comprises a central shaft portion and a plurality of discs secured to said central shaft portion in axially spaced relationship, each of said discs being of successively larger diameter, and said fingers being secured in spaced relation to the peripheries of said discs.

7. A digging and windrowing implement for root crops, comprising a frame having a pair of transversely spaced depending legs and a trailing beam on each leg, respectively, a digging blade at the foot of each leg, said blades being inwardly and rearwardly convergent to terminate in spaced relation rearwardly and centrally of said legs, a pair of rotatable generally conical drums having peripheral radially projecting fingers, bearing means journalling said drums on said beams, respectively, generally above and rearwardly of said blades, said drums having their inner ends spaced transversely from one another and being of inwardly diminishing diameter, the transverse rotational axis of said drums being inclined downwardly and inwardly so that the lower extremities of said drums are substantially horizontal and the drum leading edges are generally transversely parallel to said convergent blades, drive means for rotating said drums, and trailing upwardly deflected tines carried by said blades extending into close proximity to said drums to convey a root crop from said blades to said drums.

8. A peanut harvester for use with a tractor having a pair of laterally spaced, power lifted trailing hitch links and a central top link, comprising a transversely disposed, inverted U-shaped main frame constructed and arranged to straddle a row of peanuts, said main frame having a horizontal bight portion and depending vertical leg portions, bracket means on said main frame adapted for pivotal connection respectively to the tractor hitch links, means on the bight portion of said main frame adapted for pivotal connection to the tractor top link, whereby said main frame is liftable by the tractor hitch links, a digging blade secured to a lower portion of one of said vertical leg portions and constructed and arranged to loosen the vines in the soil as the harvester proceeds along the row, a rotatable vine lifting device carried by a medial portion of said one vertical leg portion and rearwardly thereof, bearing means carried by said leg portion for journaling said vine lifting element for rotation about a transverse and downwardly inclined axis overlying the row of peanuts, and means for driving said vine lifting element at a speed proportional to the ground speed of the tractor.

FRANCIS O. FALKNER.

References Cited in the file of this patent

UNITED STATES PATENTS

| Number | Name | Date |
| --- | --- | --- |
| 63,659 | Sisson | Apr. 9, 1867 |
| 428,288 | Pomeroy | May 20, 1890 |
| 1,014,493 | Lauritzen et al. | Jan. 9, 1912 |
| 1,015,110 | Willis | Jan. 16, 1912 |
| 1,154,368 | Boyd | Sept. 21, 1915 |
| 1,285,633 | Cummings | Nov. 26, 1918 |
| 2,223,002 | Ferguson | Nov. 26, 1940 |
| 2,417,905 | Blaydes | Mar. 25, 1947 |

FOREIGN PATENTS

| Number | Country | Date |
| --- | --- | --- |
| 16,646 | Great Britain | 1903 |